Nov. 4, 1952 P. J. J. TERCÉ 2,616,253
CONSTANT TORQUE GAS TURBINE WITH COUNTERROTATING ELEMENTS
AND SPEED CONTROLLED FUEL AND AIR SUPPLY
Filed Feb. 23, 1946 3 Sheets-Sheet 2
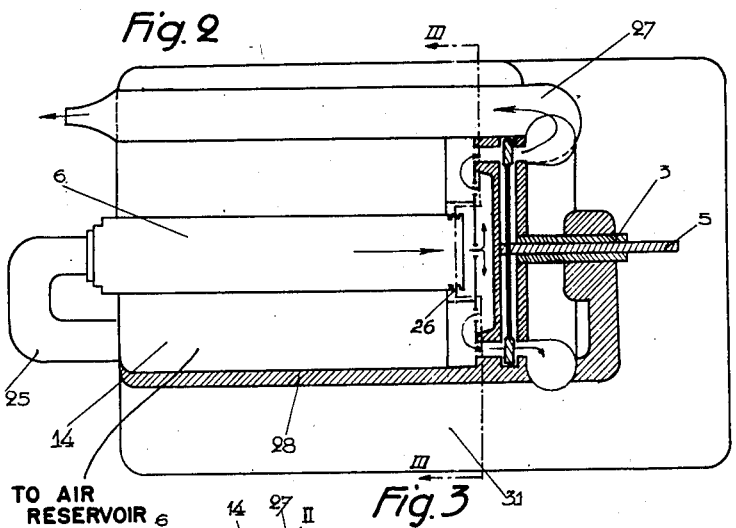
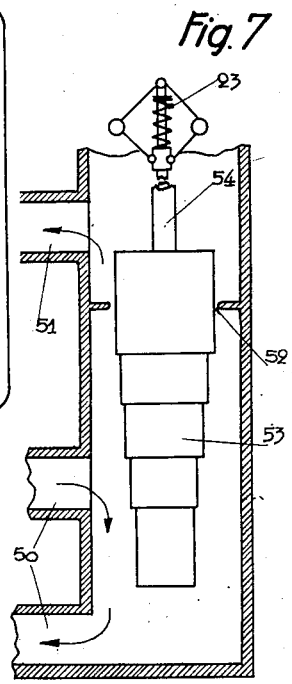
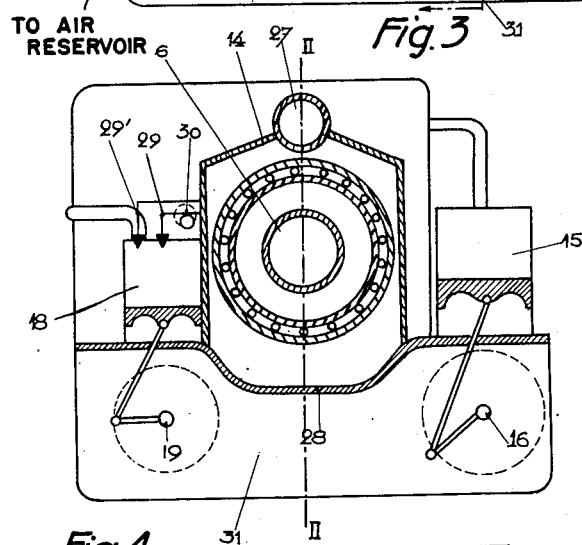
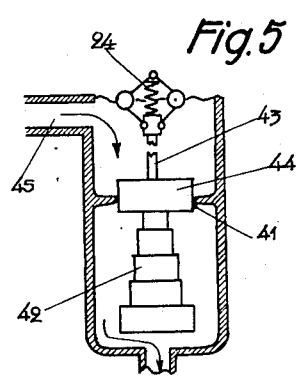
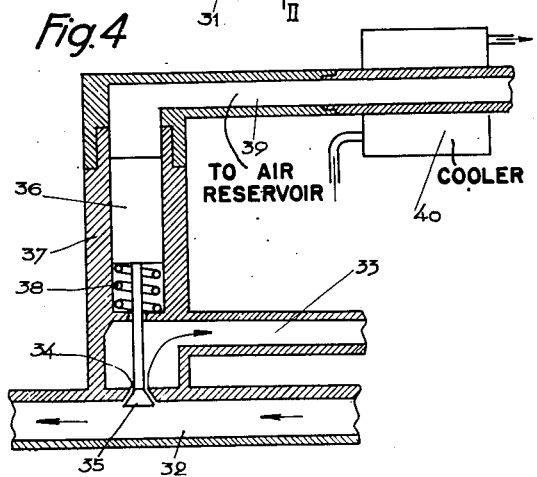
INVENTOR:
PAUL JOSEPH JEAN TERCÉ
BY Leon M. Straus
AGT.

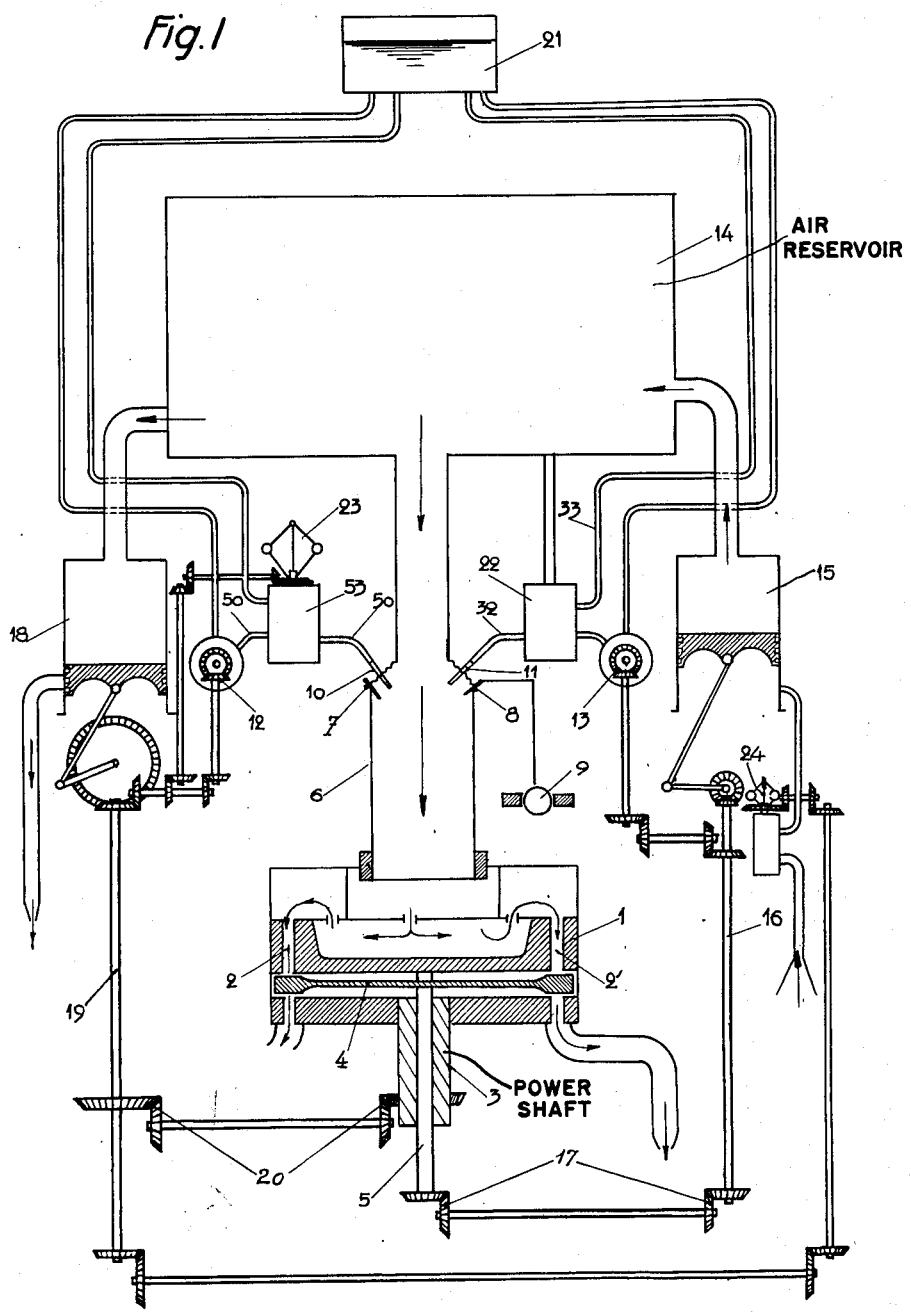

Nov. 4, 1952     P. J. J. TERCÉ     2,616,253
CONSTANT TORQUE GAS TURBINE WITH COUNTERROTATING ELEMENTS
AND SPEED CONTROLLED FUEL AND AIR SUPPLY
Filed Feb. 23, 1946     3 Sheets-Sheet 3
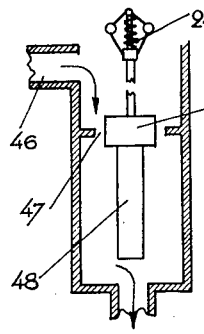
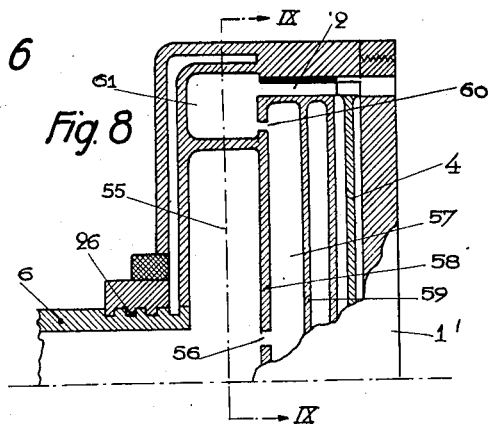
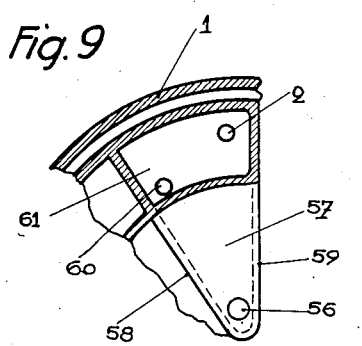
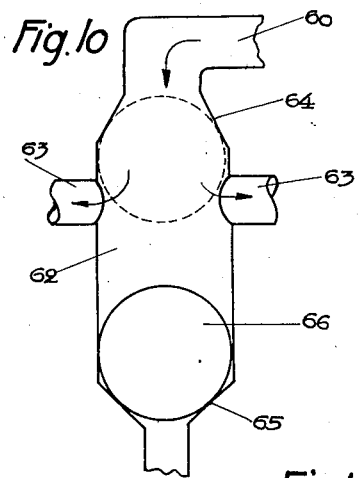
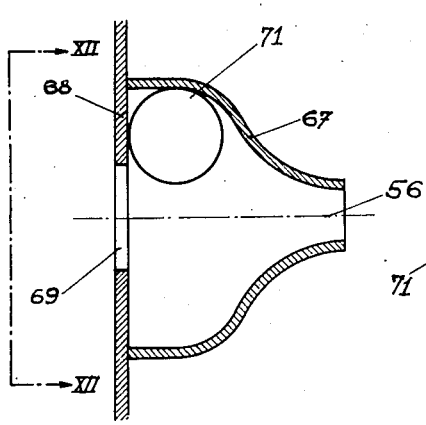
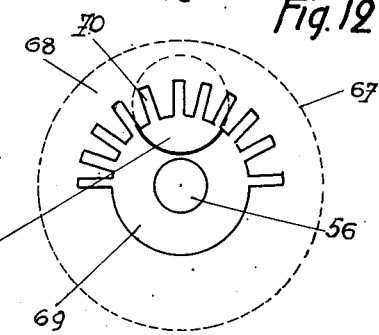
INVENTOR:
PAUL JOSEPH JEAN TERCÉ
BY Patented Nov. 4, 1952

2,616,253

UNITED STATES PATENT OFFICE 2,616,253

CONSTANT TORQUE GAS TURBINE WITH COUNTERROTATING ELEMENTS AND SPEED CONTROLLED FUEL AND AIR SUPPLY

Paul Joseph Jean Tercé, Paris, France

Application February 23, 1946, Serial No. 649,551
In France February 23, 1945

18 Claims. (Cl. 60—39.28)

The present invention relates to turbines of the type whose running conditions are calculated for a predetermined speed of the bladed rotor with which the power shaft of the turbine is operatively connected.

As far as gas turbines are concerned, it is possible, by using certain expedients, to drive said turbines at speeds different from their normal working speed. However, the range within which the speed may be varied is still very limited, the torque developed decreasing substantially with a corresponding decrease in the turbine speed.

An object of the present invention is to provide means maintaining the torque of a gas turbine substantially constant even if the turbine speed varies over a wide range.

Whereas in an ordinary gas turbine, the gases which leave the fixed nozzles at a high speed, act by deflection on the blades of the rotor, in the turbine of the present invention, the nozzles are adapted to revolve coaxially with the rotor, without any mechanical connection between said rotor and the element or support for carrying the nozzles. The aforesaid arrangement provides two motors in series, traversed by the same motive fluid and revolving in opposite directions with respect to one another, the first one being a reaction engine formed by the movable part of the nozzle-carrying element, and the other being a deflection engine formed by the rotor.

Briefly described, the present invention provides a reaction engine which is operatively connected to the power shaft and a deflection engine which drives a compressor furnishing compressed air to a reservoir intended for the supply of both engines, successively, after its passage through a combustion chamber, the deflection engine further actuating a pump controlling the supply of fuel to said combustion chamber.

According to another object of the invention there is provided a supplementary fuel supply accurately controlled in accordance with the pressure in the compressed air reservoir.

A further feature of the present invention provides for the use of deflectors which are integral with the nozzle-carrying element, and employ the potential energy of the gases under most economical conditions.

In the general case, where the power developed by the rotor is higher than the power absorbed by the compressor, the invention provides an expander inserted between the compressed air reservoir and the power shaft so that a part of the excess of power developed by the rotor may be returned to the power shaft. In this case, the invention provides a second fuel supply means controlled by the speed of the power shaft.

The above objects and advantages of the present invention will become apparent upon consulting the following detailed description of the invention when taken in conjunction with the drawings, wherein:

Fig. 1 is a diagrammatic view of the turbine plant;

Fig. 2 illustrates diagrammatically the engine and is a sectional view taken along the line II—II of Fig. 3;

Fig. 3 is a sectional view of the engine of Fig. 2 taken along the line III—III;

Fig. 4 shows the device for controlling the supply of the fuel in accordance with the pressure in the air reservoir;

Figs. 5 to 12 illustrate automatic speed governing devices, and more particularly, Figs. 5 and 6 show automatic devices controlling the air supply to the compressors in accordance with the speed;

Fig. 7 illustrates a device for controlling the the supply of the fuel;

Figs. 8 and 9 illustrate, respectively, the nozzle carrying drum in axial section and in transverse section, the latter being taken along the line IX—IX (Fig. 8);

Fig. 10 shows an automatic valve device controlling the supply of auxiliary nozzles operative for speeds lower than the one which corresponds to the normal working speed of the turbine;

Figs. 11 and 12 are an axial section and end view, respectively, of an automatic valve device controlling the supply of all of the nozzles corresponding to the normal working speed, Fig. 12 being a view taken along line XII—XII of Fig. 11.

The gas turbine illustrated in Fig. 1 comprises a rotor 4 provided with blades and mounted on a shaft 5, an oppositely rotating drum shaped casing 1 provided with or carrying nozzles 2, 2' and exhaust passages of constant cross section for the gases. The casing 1 is mounted on a hollow power shaft 3 which is coaxial with the shaft 5. The casing 1 is rotatably fitted on the cylindrical end portion of the combustion chamber 6, the latter being provided with sparking plugs 7, 8 controlled by an ignition device 9. Projecting into the combustion chamber 6 are two injectors 10, 11 supplied with fuel by means of pumps 12, 13, respectively.

The combustion chamber 6 is further supplied with compressed air from a constant pressure reservoir 14 which is fed by a compressor, shown diagrammatically at 15. The compressor 15 is driven by the shaft 16 which is connected to the shaft 5 by gearing 17. The power on the rotor 4 is usually higher than that needed for the compression of the air supply to the turbine, and accordingly more air is compressed than needed. Therefore, it is necessary to evacuate this excess of air into an expander 18, the shaft 19 of which is coupled to the hollow shaft 3 by means of gearing 20.

Thus without taking into account the mechanical efficiency of the transmission, the excess of useful power on the rotor 4 is recovered and a pneumatic coupling is established between the rotor 4 and the drum-shaped casing 1 contributing to the stability of the turbine. In order to effect the desired control of the fuel supply in accordance with the speed of the revolving members and of the pressure in the reservoir 14, the pumps 12, 13 which supply the injectors 10, 11 with fuel from the tank 21, are governed by the shaft 3 of the drum-shaped casing and by the shaft 5 of the rotor 4. Furthermore, between the pump 13 and the injector 11, there is inserted a pressure-responsive device 22, which will be subsequently described in detail and which causes the automatic return into the tank 21 of a part of the fuel delivered by the pump 13. The automatic return is regulated in accordance with the pressure in the reservoir 14. A similar pressure-responsive device 53, which is governed by a centrifugal governor 23 controlled by the driving shaft, is inserted between the pump 12 and the injector 10. Governor 23 or another governor 24 is employed for controlling the air supplied to the compressor 15. The described governing arrangement forms in combination with the control of the outlet of the turbine nozzles, an automatic speed change device which will be subsequently described in detail.

In order to reduce heat losses, the combustion chamber 6 passes entirely through the compressed air reservoir 14 as shown in Figs. 2 and 3. One end of the chamber 6 is connected by means of an elbow 25, to the reservoir 14, whereas the other end projects from the reservoir 14 and is provided with a baffle joint 26 on which is mounted the revolving drum-shaped casing 1.

The gases, having passed through the nozzles 2 and over the blades of the rotor 4 escape through a heat exchanger, shown diagrammatically at 27. The compressed air furnished by the compressor 15 before entering the reservoir 14 flows in the direction opposite to the flow of gas in this exchanger and is thus preheated.

The lower wall 28 of the reservoir 14 is reinforced and serves as a base for the turbine 1, 4 as well as for compressor cylinders and for expanders. The compressor is preferably arranged exteriorly of casing 31 and the expanders 18 are placed within the casing 31. The expanders 18, only one of which is shown for the sake of clearness whereas the others are located in front of and behind the one shown, are connected with the reservoir 14 by means of valves 29 which are controlled by a cam shaft 30. Further the cam shaft 30 governs the valves 29' which control the communication of the expanders 18 with the atmosphere for evacuating the expanded air. The various component parts of the compressor and expanders are enclosed within casing 31 which is located below the reservoir 14 and preferably contains an oil bath. The compression stage is cooled in any known manner, not shown. The installation may further comprise an auxiliary starter, likewise not shown.

In Fig. 4 there is illustrated the pressure responsive device for controlling the delivery of fuel in accordance with the pressure in reservoir 14. Pipe 32 which connects pump 13 with injector 11 is branched by a by-pass conduit 33 leading into the fuel tank 21. Pipe 32 and conduit 33 communicate through a calibrated orifice 34 of conical form, the constriction of which is controlled by a complementary valve 35 carried on one end of a rod. The other end of the rod carries a piston 36 slidably supported in a cylinder 37.

The piston 36 is urged in the direction of the closure of valve 35, under the action of spring 38, and in the direction of the opening of valve 35, under the action of air pressure in the reservoir 14.

The reservoir is connected to the cylinder 37 by means of the pipe 39, preferably fabricated of copper, and cooled by water circulating in a sleeve 40. The spring and the face of piston 36 subjected to the action of the compressed air are designed in a manner to obtain, when the air pressure in the reservoir varies, the desired control of the delivery of fuel. The shape of the valve 35 is chosen in such a way that the fuel pressure may only have a very slight influence on the operation of the device.

It is evident that any increase of pressure in the reservoir will cause an enlargement of the communication between the pipes 32, 33, causing thus a decrease of the amount of delivery of fuel to the combustion chamber resulting in a decrease of the pressure in the combustion chamber at the inlet of the nozzles.

Conversely, a decrease in the pressure prevailing in the reservoir results in the closing of the orifice 34, and therefore in an increase in the amount of fuel delivered and in a reestablishment of the high pressure in chamber 6.

The turbine construction in this manner will have following characteristics:

The drum-shaped casing 1 fixed to the engine shaft revolves in the direction opposite to that of the bladed rotor 4. In normal running conditions, the proportion between the speed of the rotor and that of the casing 1 is of the order of 3 to 4.

The engine torque remains substantially constant during the variation of speed and increases even slightly when the speed corresponding to the normal working conditions falls down to one third of its normal-running value. For an increase of the speed beyond its value corresponding to the normal running value, the torque decreases slightly.

The automatic speed responsive devices are illustrated in Figs. 5 to 12 as incorporated in the plant of Fig. 1. To obtain working conditions of substantially constant useful power, the speed-responsive controlling devices should be provided at small variations of speed in the vicinity of some chosen speed values, and at the passage from one "constant torque" working condition to the other "constant torque" working condition, the torque varying, during the passage from one such condition to the other inversely to the speed. In these conditions, the speed variations ought to act simultaneously and correspondingly on:

(1) The amount of air admitted in the compressor.

(2) The amount of delivery of fuel.

(3) The amount of the gases passing through the nozzles.

These speed-responsive controlling devices, which may give a certain degree of freedom when starting the engine will provide simultaneous and correlative variations of the three above conditions. The first two conditions are obtained, as already indicated, by means of one or more governors 23, 24. The speed-responsive device for controlling the admission of air in the compressor is shown in Figs. 5 and 6. For this purpose, the turbine comprises two compressors, one for the speed corresponding to the normal running and to the slowing down conditions, the other for speeds lower than that corresponding to the normal running value. The control of the supply of air to the auxiliary compressor is obtained as shown in Fig. 5 by means of a calibrated orifice 41 provided on the supply pipe 45, and which is more or less closed by a fourfold stepped valve 42, the stem 43 of which is actuated by a centrifugal governor 24 and carries a number of steps corresponding to the required rates of speeds.

This stem is fitted on both its ends with cylindrical blocks 44 closing nearly the calibrated orifice 41, either on normal running conditions or at slow down or idle conditions.

The supply to the compressor for the normal and running speeds is governed by a similar device shown in Fig. 6 and comprises, on the supply duct 46, an opening 47 traversed by a valve rod 48 of constant section and corresponding to the normal running conditions.

The valve rod 48 carries at its end a block 49 having an enlarged diameter and corresponding to the slow down conditions, the rod 48 being actuated by the same governor 24 which drives the fourfold stepped valve of the auxiliary compressor, or by a separate governor.

A similar device, shown in Fig. 7, controls the delivery of fuel in accordance with the speed of rotation of the casing or drum 1. For this purpose, there is branched to the pipe 50 connecting the pump 12 to the injector 10, a by-pass pipe 51 leading back to the tank 21. The pipes 50 and 51 communicate through a calibrated opening 52 controlled by a fourfold profiled valve 53 which is actuated by a centrifugal regulator 23 rotating at a speed proportional to that of the drum or casing 1 and which comprises as many steps as speed rates are required. Valve 53 further has an end portion 54 of a reduced diameter corresponding to the slowing down or idle conditions.

Instead of using profiled valves as described above, a series of orifices may be provided, successively opened for predetermined speed rates by means of suitable automatic devices.

An automatic control of the amount of gases passing through the nozzles may be obtained, for example, with a particular arrangement of the casing or drum 1 carrying the nozzle shown in Figs. 8 and 9. This drum comprises a cylindrical main inlet chamber 55 connected through openings 56 with a certain number of chambers 57 determined by radial partitions such as 58, 59. The chambers 57 communicate through the openings 60 with boxes 61 arranged circumferentially on the drum around the chambers 55, and constituting each an individual inlet compartment for each nozzle.

The drum is provided with a plurality of nozzles, all of which are supplied with the driving medium during the normal running conditions of the turbine. However, only some of the nozzles are supplied with the driving medium during slowing down of the turbine. The drum or casing 1 is further provided with auxiliary nozzles operative at slow down conditions while the successive speed changes take place. The nozzles used for the normal running conditions are inoperative during idle running and the auxiliary nozzles are supplied by a single and the same intermediate chamber 57.

The opening 60 through which the radial chambers 57 communicate with the individual compartments 61 of the auxiliary nozzles are controlled by valves actuated by means of centrifugal force and each of such valves is constituted, as shown in Fig. 10, by a tube 62, made for example of silica, radially disposed in the drum and communicating at its middle part 63 with compartments 61, whereas through its outer end 64 it communicates with the intermediate chamber and through its inner end 65 with the atmosphere. The ends of the tube 62 are of conical form, the inner conical end or seat 65 having a wider cone angle and the diameter of the tube in the vicinity of this cone being slightly greater than the corresponding diameter in the vicinity of the outer conical end or seat 64. Inside the tube 62 is located a movable ball 66, made, for example, of quartz. At low speeds the ball 66 is in contact with the inner conical seat 65 which it leaves when the centrifugal force becomes greater than the product of the gas pressure by the surface of the contacting circle of the ball on the wall of the inner conical seat.

Under the action of such force the ball starts moving, and arrives in a position wherein the ball is under the action of centrifugal force in the outer conical seat 64. The inner conical seat 65 being more widely open than the outer conical seat 64, the surface of the contacting circle of the ball 66 on the inner conical seat 65, is smaller than that on the outer conical seat 64. The thrust of the pressure being stronger when the ball bears on the outer conical seat 64, it may be so adjusted that the ball be in a state of equilibrium either on the seat 65 or on the seat 64 for the same speed of the drum 1.

Further, the opening 56 establishing the communication between the inlet chamber 55 and the intermediate chamber 57 supplying the auxiliary and the main nozzles inoperative at low speed, is controlled by an automatic valve shown in Figs. 11 and 12, and which comprises chamber 67, made preferably of silica. The axis of chamber 67 is parallel to the drum's axis and suitably spaced with respect to the latter. The chamber 67 is provided with a restricted passage corresponding with the opening 56 and is partly closed on the side of the chamber 55 by a partition 68 which is provided with an inlet 69 and radially arranged slots 70 on the outer part of its surface (see Fig. 12).

A ball 71, made preferably of quartz, moves inside chamber 67. When at rest, the ball remains at the lowest point of the chamber wall. When the drum begins to revolve, the ball first has a tendency to roll on the circumference of the chamber in the neighborhood of the remotest portion from the drum axis. However, the flow of the gas through the opening 56 exerts on the ball, when leaving the chamber through the slots 70, a sufficient thrust to overcome, at low speeds, the centrifugal force and to urge the ball against the orifice 56.

The turbine then operates with a very reduced gas supply. When the speed increases, the ball is detached by the centrifugal force and returns to the rim of the chamber, uncovering the orifice 56. The engine then operates with a maximum gas supply until the speed increasing to a value for which the devices governing the amount of gases supplied to the auxiliary nozzles become operative in their turn.

The operation of this device is irreversible, the ball 71 uncovering the opening 56 only when the speed of the drum falls to a value which is considerably lower than the one corresponding to the detachment during the acceleration period. This lack of reversibility does not, however, present any inconveniences, for the slowing down of the engine is usually preceded by a breaking operation which lowers the speed below the value corresponding to the closing of the opening 56 by the ball. The controlled speed change devices would operate according to the same principle as used for the automatic devices, but their arrangement, consistent with that of means usually employed in turbines, will be different.

The turbine described above operates as follows:

Air at atmosphere pressure is sucked in the compressor 15 which is then subjected to an isothermal compression. The compression takes place at the predetermined pressure at which the compressed air is introduced in the tank 14.

After the compressed air is preheated by its contact with the walls of the heat exchanger 27 and of the combustion chamber, the preheated compressed air is supplied to the tank 14 and enters the combustion chamber in the upper part of which are disposed the fuel injectors 10, 11 with the associated spark plugs 7, 8.

A slow combustion starts which increases the temperature of the mixture, the mixture being at a constant pressure. The products of combustion enter the drum or casing 1 which they leave through the nozzles 2 and are then subjected to expansion in the blades of the rotor 4 as well as in the parts of the nozzles situated under the wheel. The expanded products of combustion leave the engine through the exhaust piping 27.

Although the invention has been described with respect to one specific embodiment thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent is:

1. A gas turbine comprising a compressed air reservoir, a combustion chamber in communication with said compressed air reservoir, a fuel reservoir including fuel injectors leading into said combustion chamber, and spark plugs in said combustion chamber to ignite therein the mixture of fuel and compressed air; in combination, with an element carrying nozzles, conduit means establishing communication between said combustion chamber and said nozzles to thereby supply gases issued from the combustion chamber to said nozzles, at least some of said conduit means and at least some of said nozzles being adapted to revolve around an axis, rotor means having blades and coaxially mounted with respect to the axis of the nozzle-carrying element, the blades of said rotor means being arranged for impingement by the gases leaving said nozzles to rotate said rotor means in a direction opposite to that of said nozzle-carrying element, a first shaft operatively connected to said nozzle-carrying element, a second shaft operatively connected to said rotor means, and a compressor operatively connected to said second shaft and supplying said compressed air reservoir in accordance with the speed of said second shaft.

2. A gas turbine according to claim 1, including pressure responsive means, said pressure responsive means being connected to said injectors and acting upon same responsive to the pressure in said compressed air reservoir, and pump means operatively connected to said second shaft and provided with further conduit means to supply said injectors with fuel from said fuel reservoir.

3. A gas turbine comprising a compressed air reservoir, a combustion chamber in communication with said compressed air reservoir, a fuel reservoir including fuel injectors leading into said combustion chamber, and spark plugs in said combustion chamber to ignite therein the mixture of fuel and of compressed air; in combination with a drum-shaped casing rotatably supported on said combustion chamber, nozzles provided in said drum-shaped casing, gas conducting means in said drum-shaped casing for delivering the gases issued from said combustion chamber to said nozzles to thereby revolve said drum-shaped casing, a rotor having blades and disposed within said drum-shaped casing for rotation about an axis common to said casing and to said rotor, the blades of said rotor being arranged for impingement by the gases leaving said nozzles to rotate said rotor in a direction opposite to that of said drum-shaped casing, a first shaft operatively connected to said casing, a second shaft operatively connected to said rotor, and an air compressor in communication with said compressed air reservoir and operatively connected to said second shaft to adjust the supply of compressed air to said compressed air reservoir in accordance with the speed of said second shaft, said first shaft being hollow and surrounding at least part of said second shaft.

4. A gas turbine comprising a compressed air reservoir, a combustion chamber in communication with said compressed air reservoir, a fuel reservoir including fuel injectors leading into said combustion chamber, and spark plugs in said combustion chamber to ignite therein the mixture of fuel and of compressed air; in combination with a drum-shaped casing rotatably supported by said combustion chamber, nozzles provided on said drum shaped casing, gas supplying means in said drum shaped casing for delivering the gases issued from said combustion chamber to the said nozzles and arranged to rotate said drum-shaped casing, a rotor having blades coaxially disposed within said casing and rotatably mounted therein, said blades being arranged for impingement by the gases leaving said nozzle to rotate said rotor in a direction opposite to that of said drum-shaped casing, a first shaft operatively connected to said rotor, a hollow power shaft operatively connected to said casing, an air compressor communicating with said compressed air reservoir and operatively connected to said first shaft to adjust the supply of compressed air to said compressed air reservoir in accordance with the speed of said first shaft, a fuel supply pump operatively connected to said first shaft and having a fuel pressure pipe connected to one of said fuel injectors, and valve means responsive to the pressure to said compressed air reservoir and inserted in said fuel pressure pipe to adjust the fuel delivery to said one fuel injector in accordance with the pressure in said compressed air reservoir.

5. A gas turbine comprising a compressed air reservoir, a combustion chamber in communication with said compressed air reservoir, a fuel reservoir, fuel injectors leading into said combustion chamber and spark plugs in said combustion chamber to ignite therein the mixture of fuel and of compressed air; in combination with a casing rotatably supported by the combustion chamber, nozzles provided on said casing, gas supplying means in said casing for delivering the gases issued from said combustion chamber to said nozzles and arranged to revolve said casing, a rotor having blades coaxially disposed within said casing and rotatably mounted therein, said blades being arranged for impingement by the gases leaving said nozzle to rotate said rotor in a direction opposite to that of said casing, a first shaft operatively connected to said rotor, a hollow power shaft operatively connected to said casing, an air compressor delivering into said compressed air reservoir and operatively connected to said first shaft to adjust the supply of compressed air to said compressed air reservoir in accodance with the speed of said first shaft, a fuel supply pump operatively connected to said first shaft and having a fuel pressure pipe connected to one of said fuel injectors, valve means responsive to the pressure in the compressed air reservoir and inserted in said fuel pressure pipe to adjust the fuel delivery to said one fuel injector in accordance with the pressure in said compressed air reservoir, an air expander communicating with said compressed air reservoir and operatively connected to said power shaft to expand compressed air in accordance with the speed of said casing, a second fuel supply pump having a fuel pressure pipe connected to another of said fuel injectors, and valve means inserted in said last named fuel pressure pipe and responsive to the speed of said casing to adjust the fuel supplied to said other injector in accordance with the speed of said casing.

6. A gas turbine comprising a compressed air reservoir, a combustion chamber in communication with said compressed air reservoir, a fuel reservoir, fuel injectors leading into said combustion chamber, and spark plugs in said combustion chamber to ignite therein a mixture of fuel and of compressed air; in combination with a casing rotatably supported by said combustion chamber, nozzles provided in said casing, gas supplying means in said casing for delivering the gases issued from the combustion chamber to said nozzles and arranged to revolve said casing, a rotor having blades coaxially disposed within said casing and rotatably mounted therein, said blades being arranged for impingement by the gases leaving said nozzle to rotate said rotor in a direction opposite to that of said casing, a first shaft connected to said rotor, a hollow power shaft freely mounted over said first shaft and connected to said casing, and an air compressor delivering into said compressed air reservoir and operatively connected to said first shaft to adjust the supply of compressed air to said compressed air reservoir in accordance with the speed of said first shaft.

7. A gas turbine comprising a compressed air reservoir, a combustion chamber in communication with said compressed air reservoir, a fuel reservoir, fuel injectors leading into said combustion chamber and spark plugs in said combustion chamber to ignite therein a mixture of fuel and of compressed air; in combination with a drum-shaped casing rotatably supported by said combustion chamber, nozzles provided in said drum-shaped casing, gas supplying means in said drum-shaped casing for delivering the gases issued from said combustion chamber to said nozzles and arranged to cause said drum-shaped casing to revolve, a rotor having blades coaxially disposed within said casing and rotatably mounted therein, said blades being arranged for impingement by the gases leaving said nozzle to rotate said rotor in a direction opposite to that of said drum-shaped casing, a first shaft operatively connected to said rotor, a hollow power shaft freely mounted on said shaft and operatively connected to said drum-shaped casing, an air compressor delivering into said compressed air reservoir and operatively connected to said first shaft, an air expander communicating with said compressed air reservoir and operatively connected to said hollow power shaft to expand compressed air in accordance with the speed of said drum-shaped casing, a first fuel supplying pump operatively connected to said first shaft, a first fuel supplying pump operatively connected to said first shaft, a first fuel intake pipe connecting said first pump to said fuel reservoir, a first fuel pressure pipe connecting said first pump to one of said injectors, a first valve-controlled fuel-escape device inserted in said first fuel pressure pipe and responsive to the pressure in said compressed air reservoir, a first fuel return pipe connecting said first device to said fuel reservoir, a second fuel supplying pump operatively connected to said hollow power shaft, a second fuel intake pipe connecting said second pump to said fuel reservoir, a second fuel pressure pipe connecting said second fuel pump to another of said injectors, a second valve-controlled fuel-escape device inserted in said second fuel pressure pipe and operatively connected to said power shaft, a second fuel return pipe connecting said second fuel escape device to said fuel reservoir, and a valve-controlled air-intake device associated with said compressor and operatively connected to said hollow shaft for adjusting the compressed air delivery into said air reservoir in accordance with the speed of said drum-shaped casing.

8. A gas turbine according to claim 7, wherein said first valve-controlled fuel-escape device comprises a calibrated orifice provided in said first pressure pipe and establishing communication between said first fuel pressure pipe and said first fuel return pipe, a valve for selectively constricting said orifice, a rod supporting said valve, a piston carried by said rod, a cylinder slidable receiving said piston, a spring biasing said piston in a direction wherein said valve normally constricts said orifice, and a pipe connection between said piston and said compressed air reservoir whereby said valve is movable out of the normal constricting position in accordance with the pressure in said compressed air reservoir.

9. A gas turbine according to claim 7, wherein said first valve-controlled fuel-escape device comprises a calibrated orifice provided in said first pressure pipe and establishing communication between said first pressure pipe and said first fuel-return pipe, a valve controlling said orifice, a rod integral with said valve, a piston carried by said rod, a cylinder slidably supporting said piston, a spring loading said piston in a direction for closing said orifice, a pipe connecting said piston and said compressed air reservoir and having a portion made of copper, and a water cooler surrounding said portion of said last-named pipe.

10. A gas turbine according to claim 7 further comprising a surface heat exchanger traversed by exhaust gases to preheat the compressed air entering said compressed air reservoir.

11. A gas turbine according to claim 7, wherein said expander comprises cylinders located inside said compressed air reservoir, valves connecting said cylinders with said compressed air reservoir, and a cam controlling said valves.

12. A gas turbine according to claim 7, wherein said second valve-controlled fuel-escape device comprises a calibrated orifice connecting said second fuel pressure pipe and said second fuel return pipe, a profiled valve controlilng said orifice, and a centrifugal governor drivingly connected to said hollow shaft for adjusting the position of said profiled valve in said orifice in accordance with the rotational movement of said hollow shaft.

13. A gas turbine according to claim 7, wherein said valve-controlled air-intake device comprises a calibrated orifice in the air intake duct of said compressor, a profiled valve slidably supported in said orifice, a rod integral with said valves and a centrifugal governor mounted on said rod and operatively connected to said hollow shaft.

14. A gas turbine according to claim 7, wherein said drum-shaped casing comprises a set of main nozzles operable under normal running conditions and a set of auxiliary nozzles operable under normal running conditions and a set of auxiliary nozzles operable under slowing-down running condition.

15. A gas turbine according to claim 7, wherein said drum-shaped casing includes a set of main nozzles operable under normal running conditions and a set of auxiliary nozzles operable under slowing-down running conditions, an inlet chamber provided in said drum-shaped casing, intermediate radial chambers connected to said inlet chamber, an entrance chamber for each nozzle, each entrance chamber being connected to one intermediate radial chamber, and means provided on said drum-shaped casing for putting said main nozzles and said auxiliary nozzles in service in accordance with the running condition of the turbine.

16. A gas turbine according to claim 15, wherein said last-named means comprises valves connected each to one intermediate chamber, to one entrance and to the atmosphere, each of said valves comprising a tube situated with its longitudinal axis radially of said drum-shaped casing and having conical ends, the conical outer end of said tube being connected to an intermediate radial chamber and the conical inner end of said tube being connected to the atmosphere, whereas the central portion of said tube is connected to an entrance chamber, and a ball freely movable inside said tube.

17. A gas turbine according to claim 7, wherein said drum-shaped casing includes a set of main nozzles operable under normal running conditions and a set of auxiliary nozzles operable under slowing-down running conditions, an inlet chamber provided in said drum-shaped casing, intermediate radial chambers connected to said inlet chamber, an entrance chamber for each nozzle, each entrance chamber being connected to one intermediate radial chamber, and means provided on said drum-shaped casing for putting said main nozzles and said auxiliary nozzles in service in accordance with the running condition of the turbine, each of said last-named means comprises valves connected each to one intermediate chamber, to one entrance chamber, and to the atmosphere, each of said valves comprising a slightly conical tube made of silica situated with its longitudinal axis radially of said drum-shaped casing and having conical ends, the outer conical end of said tube being connected to an intermediate radial chamber, and the inner conical end being connected to the atmosphere and having its cone angle greater than that of the outer end of said tube, the diameter of the inner end of said tube being slightly greater than that of said outer end, whereas the central portion of said tube is connected to an entrance chamber, and a ball made of quartz movable in said tube.

18. A gas turbine according to claim 7, wherein said drum-shaped casing includes a set of main nozzles operable under normal running conditions and a set of auxiliary nozzles operable under slowing-down running conditions, an inlet chamber provided in said drum-shaped casing, intermediate radial chambers connected to said inlet chamber, an entrance chamber for each nozzle, each entrance chamber being connected to one intermediate radial chamber, said inlet chamber being connected to said intermediate radial chambers through a basin, a valve operable in slowing-down running condition and arranged within said basin in spaced relation to the axis of said drum-shaped casing, an orifice in the bottom of said basin, a wall arranged between said inlet chamber and said basin and provided with slots, and a movable ball disposed within said basin and cooperating with said slots and orifice.

PAUL JOSEPH JEAN TERCÉ.

REFERENCES CITED

The following references are of record in the file of this patent:

UNITED STATES PATENTS

| Number | Name | Date |
|---|---|---|
| 1,146,707 | Holtz | July 13, 1915 |

FOREIGN PATENTS

| Number | Country | Date |
|---|---|---|
| 418,794 | France | Dec. 19, 1910 |
| 422,557 | France | Jan. 21, 1911 |
| 547,539 | France | Sept. 25, 1922 |
| 678,449 | Germany | July 15, 1939 |
| 171,685 | Great Britain | June 22, 1922 |
| 271,268 | Great Britain | May 26, 1927 |